UNITED STATES PATENT OFFICE.

EDGAR ARTHUR ASHCROFT, OF BALESTRAND, NORWAY.

TREATMENT OF METAL-BEARING SOLUTIONS.

1,071,856. Specification of Letters Patent. Patented Sept. 2, 1913.

No Drawing. Application filed April 25, 1912. Serial No. 693,233.

*To all whom it may concern:*

Be it known that I, EDGAR ARTHUR ASHCROFT, a subject of the King of England, residing at Balestrand, Sogn, Norway, have invented certain new and useful Improvements in the Treatment of Metal-Bearing Solutions, of which the following is a specification.

In the co-pending application Serial No. 693,150 there have been described processes for the treatment of sulfid ores or zinc bearing solutions wherein ammonia gas is employed for precipitation of the metals from the chlorid solutions, obtained in such treatment, in the form of hydrated oxids of the several metals which may be obtained together or separately. The ammonia in such processes is to be preferably obtained from calcium cyanamid in the known way or from other sources.

The present invention is for improvements in such processes whereby the separate treatment of the calcium cyanamid to obtain ammonia may be avoided in some cases and the usually wasted constituents of the calcium cyanamid viz. calcium oxid, carbid, etc., graphite (or caustic alkali or earthy carbonates if impure cyanids are used) are usefully employed while other operations of the process are simplified and cheapened and various nitrogenous products obtained in the most economical way.

I have discovered that if calcium cyanamid or any similar metal or alkali metal cyanids or cyanamid are added directly to the zinc chlorid solutions and subsequently heated with or without pressure the zinc will be obtained in the form of insoluble oxid or hydrate (or carbonate as the case may be) and the base of the added cyanid or cyanamid as soluble chlorid while the nitrogen will be all obtained either as ammonia or as cyanogen compounds such for instance as hydrocyanic acid, dicyandiamid, etc. The nitrogenous gas leaves the mass or emulsion of the other materials and may be collected or reacted in any useful manner as for instance for the formation of ammonium sulfate (with the sulfur gases from the zinc ore treatment) or for the formation of high grade cyanids by reacting hydrocyanic acid with caustic soda or potash or alkali metals, etc.

Two typical reactions according to this invention are given by way of example.

(*a*) Using calcium cyanamid:

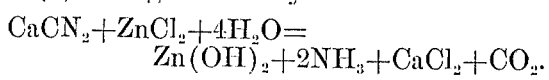

The $CO_2$ will be isolated or combined with the $NH_3$ or with the $Zn(OH)_2$ according to the temperature employed and the condition of the treatment.

(*b*) Using sodium cyanid or barium cyanid:

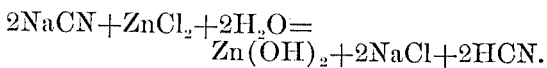

Other reactions of closely allied principle will be manifest to all versed in the art to which this invention appertains.

To illustrate this invention, the following example of two effective and useful ways in which it may be carried out are given.

Example 1: Taking a mixed sulfid ore a solution of all the remaining metals after removal of lead, silver, gold, copper, or antimony and arsenic is obtained by means of chlorin all as described in my co-pending application Serial No. 693,150 or my Patents Nos. 1011897, 1011898, 1011899. To this solution containing zinc iron manganese, etc., all as chlorids a suitable quantity of commercial calcium cyanamid is added and directly stirred in. Due allowance in calculating the quantity required according to the reaction given above should be made for free lime or carbid, etc., contained in the cyanamid. The further treatment of this emulsion may take place either in the "dry" or in the "wet" way. According to the latter the emulsion is treated by steam under pressure at a temperature about 150° to 300° C. in an autoclave or closed tank and the ammonia (and some carbonic acid) is thus driven off and utilized as required. The calcium chlorid solution resulting from the reaction is then filtered from the residue and the latter is a valuable zinc smelting (completely oxidized and high grade) ore containing also a considerable percentage of graphite carbon which is valuable as a reducing agent in the subsequent smelting operation. Any lime left in the residue is similarly useful for fluxing in the electric furnace.

Instead of treating the more or less dilute emulsion in autoclaves the zinc solutions may be employed so concentrated that on adding and stirring in the requisite quantity of cyanamid a thick stiff paste is formed which may be afterward raised in a suitable oven or furnace to the requisite temperature 200° to 500° C. and finally to about 600° C. whereby first water and ammonia and finally all the carbonic acid are driven off. Steam may be admitted during this operation with or without superheating, thus aiding the formation of ammonia. It is preferable to raise the heat slowly so as to give ample time for the reaction (a) before all the water is driven off. The residue is finally leached with water for the removal of the calcium chlorid and dried and smelted for zinc as before.

Example 2: The zinc bearing solutions obtained as in Example 1 are treated with sodium or barium cyanid which may be considerably impure with carbonates, etc., without affecting the result. On heating as described in Example 1 hydrocyanic gas is obtained and may be employed for the production of high grade cyanids in known ways either for sale or for use again or preferably it may be absorbed in the secondary electrolyte containing dissolved alkali metal employed in my process for the manufacture of cyanids, cyanamids and other like derivatives of metals described in British Letters Patent No. 228 of 1910, whereby a very high grade cyanid is produced of greater commercial value than the original cyanid employed. Almost any impure cyanid or cyanamid may be employed for this purpose. The metal base is recovered by solution and filtration as sodium chlorid (or barium chlorid or similar salts) and may be employed for any useful purpose particularly it may be electrolyzed for the production of the chlorin required in the zinc ore treatment and the simultaneous production of cyanids or hydrates of the base for sale or for use in the next operation. I have further found that the residues from treating calcium cyanamid with water and steam under pressure in the usual way for the production of ammonia, which consists of calcium carbonates and oxids mixed with graphite carbon and some impurities may also very advantageously and economically be employed for a similar object by adding them to the zinc solutions as aforesaid either with or without a metal cyanid or cyanamid and that for this purpose it is not always necessary to filter press the residues as is practised at present in order to recover the ammoniacal solution entangled therein as such ammonia is recovered in the after treatment whereby great economies are effected. It is also possible by means of this invention to combine the operations of producing dicyandiamid and ammonia and (or) ammonium carbonate from calcium cyanamid and a zinc smelting product from the zinc chlorid solutions, each product being obtained in a more economical manner than if the whole treatment is limited to one product. I will give an example of one method of working the invention in this way but I do not of course confine myself to this exact method of procedure.

A ton of ordinary commercial cyanamid is first treated with water and stirred well up by which means any acetylene due to residual calcium carbid is disposed of safely and one difficulty at present experienced in the manufacture of ammonia is obviated. The insoluble residue containing the graphite and the impurities which will amount to about 42% of the original weight is then separated by settling and decantation. The solution containing soluble calcium cyanamid (about 58% of the original material) may then be treated in known ways, viz. by adding an alkali and crystallizing out dicyandiamid at a low temperature or evaporating to produce ammonia and (or) ammonium carbonate at a high temperature or by evaporating under pressure without an alkali the products are ammonia and calcium carbonate which is obtained in pure precipitated form. Any residual nitrogen contained with the residues is recovered as described above during the heating of the same, and it is therefore not necessary to employ the usual expensive treatment necessary for the final extraction.

Although the operations have been described as applied to ores, concentrates, or solid residues of zinc, it is to be understood that zinc chlorid solutions produced in any other way may be similarly treated.

What I claim as my invention and desire to secure by Letters Patent is:—

1. The herein described process for the treatment of metal bearing solutions to obtain the zinc therefrom which consists in adding to the solution a cyanogen compound and subsequently heating the mixture, whereby the zinc is obtained in the form of an insoluble compound.

2. The herein described process for the treatment of metal bearing solutions to obtain the zinc therefrom which consists in adding to the solution a cyanogen compound and subsequently heating the mixture under pressure, whereby the zinc is obtained in the form of an insoluble compound.

3. The herein described process for the treatment of metal bearing solutions to obtain the zinc therefrom which consists in adding to the solution a metal cyanamid and subsequently heating the mixture, whereby the zinc is obtained in the form of an insoluble compound.

4. The herein described process for the treatment of metal bearing solutions to obtain the zinc therefrom which consists in adding to the solution a metal cyanamid and subsequently heating the mixture under pressure, whereby the zinc is obtained in the form of an insoluble compound.

5. The herein described process for the treatment of metal bearing solutions to obtain the zinc therefrom which consists in adding to the solution calcium cyanamid and subsequently heating the mixture, whereby the zinc is obtained in the form of an insoluble compound.

6. The herein described process for the treatment of metal bearing solutions to obtain the zinc therefrom which consists in adding to the solution calcium cyanamid and subsequently heating the mixture under pressure, whereby the zinc is obtained in the form of an insoluble compound.

7. The herein described process for the treatment of metal bearing solutions to obtain the zinc therefrom which consists in adding to the solution calcium cyanamid, heating with steam under pressure to about 150 to 300° C. to drive off the ammonia, and filtering the metal chlorid solution from the residue, whereby the zinc is obtained in the form of an insoluble compound.

8. The herein described process for the treatment of metal bearing solutions to obtain the zinc therefrom which consists in adding to the solution a cyanogen compound and the residues obtained from treating calcium cyanamid with water and steam under pressure for the production of ammonia, whereby the zinc is obtained in the form of an insoluble compound.

9. The herein described process for the treatment of metal bearing solutions to obtain the zinc therefrom which consists in adding to the solution calcium cyanamid and the residues obtained from treating calcium cyanamid with water and steam under pressure for the production of ammonia, whereby the zinc is obtained in the form of an insoluble compound.

In testimony whereof I have signed my name to this specification in the presence of two subscribing witnesses.

EDGAR ARTHUR ASHCROFT.

Witnesses:
PAUL ARRAS,
CLÄRE SIMON.

---

Copies of this patent may be obtained for five cents each, by addressing the "Commissioner of Patents, Washington, D. C."